United States Patent [19]

Harmon

[11] 4,053,880
[45] Oct. 11, 1977

[54] KEYING APPARATUS

[76] Inventor: John P. Harmon, PSC Box 1019, APO New York, N.Y. 09611

[21] Appl. No.: 638,212

[22] Filed: Dec. 5, 1975

[51] Int. Cl.² .............................................. G08C 9/08
[52] U.S. Cl. ............................................... 340/365 R
[58] Field of Search .................. 340/365 R, 337, 345; 178/17.5, 79

[56] References Cited

U.S. PATENT DOCUMENTS

| | | | |
|---|---|---|---|
| 1,110,872 | 9/1914 | Borschnek | 340/337 |
| 2,376,846 | 5/1945 | Field et al. | 340/365 R |
| 2,627,599 | 2/1953 | MacKay | 178/79 |
| 2,948,886 | 8/1960 | McIlwain | 340/365 R |

Primary Examiner—Thomas A. Robinson
Attorney, Agent, or Firm—Joseph E. Rusz; William Stepanishen

[57] ABSTRACT

A keying apparatus utilizing a plurality of key pins arranged in a predetermined configuration which may be preset to accept a coded pattern that may be used to set keyguns.

2 Claims, 4 Drawing Figures

KEYING APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a code-setting apparatus and in particular to a keygun code keying apparatus having a plurality of possible code key settings.

In the vast area of air traffic control utilizing radar control beacons, such as the Mark XII SIF system for the identification of friendly military aircraft on a worldwide basis, there has been incorporated an electronic recognition feature entitled Mode 4. Mode 4 utilizes a crypto device which is installed in all aircraft and must be keyed with a hand-held keygun. This keygun has a plurality of pins each of which may be set at any one of a number of positions. The keygun is set for aircrews by Tactical Communications personnel from preprinted keylist extracts. A problem area exists in the setting of these guns since approximately five minutes are required to key and check the keygun. Even with checking, the chances for error are considerable with more than one thousand possible combinations per keygun. The present invention provides a keying device to key the keyguns rapidly and with a high degree of accuracy.

SUMMARY

The present invention provides a keying apparatus for keying a keygun which has a plurality of pins each of which may be set at any of numerous positions. The keying apparatus is composed of three major elements: a series of pin guide tubes, keying pins, and a pin locking mechanism. The keyguns are used to electrically code equipment by providing code data by virtue of varying pin extension. The keying apparatus provides a series of tubes in which ride a plurality of metal pins, all of which may be locked into position. Operation of the device consists of inserting a keyed keygun creating a reverse setting in the device and then locking the pins into position for use in keying other keyguns.

It is therefore one object of the present invention to provide an improved keying apparatus for pre-setting a recognition code in hand-held keyguns.

It is another object of the invention to provide an improved keying apparatus having the capability of being preset to any of a plurality of code combinations.

It is yet another object of the invention to provide an improved keying apparatus for keying keyguns rapidly and with a high degree of accuracy.

These and other advantages, objects and features of the invention will become more apparent from the following description taken in connection with the illustrative embodiment in the accompanying drawings.

DESCRIPTION OF THE PREFERRED EMBODIMENT

Figure 1:
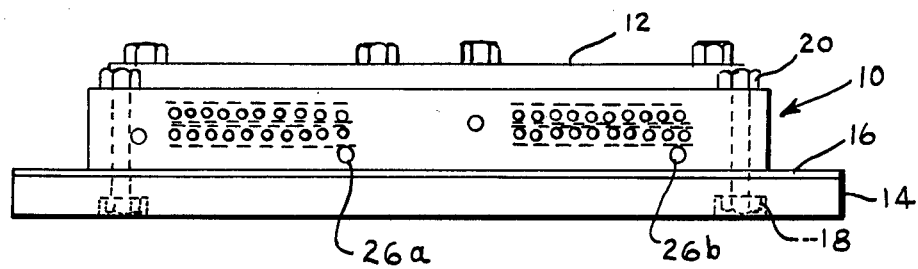
FIG. 1 is a front view of the keying apparatus in accordance with the present invention.

Referring now to FIG. 1, there is shown a front view of the keying apparatus illustrating pin guides 10 and the pin locking apparatus 12 mounted upon a base 14 with a base wear plate 16 thereon. The pin guides 10 and the pin locking apparatus 12 are fastened to the base 14 by a bolt 18 and nut 20 arrangement wherein the bolt head is recessed in the base 14. The pin guide 10 is shown with a pair of index holes 26 $a,b$ to accept the keygun indexing pin.

Figure 2:
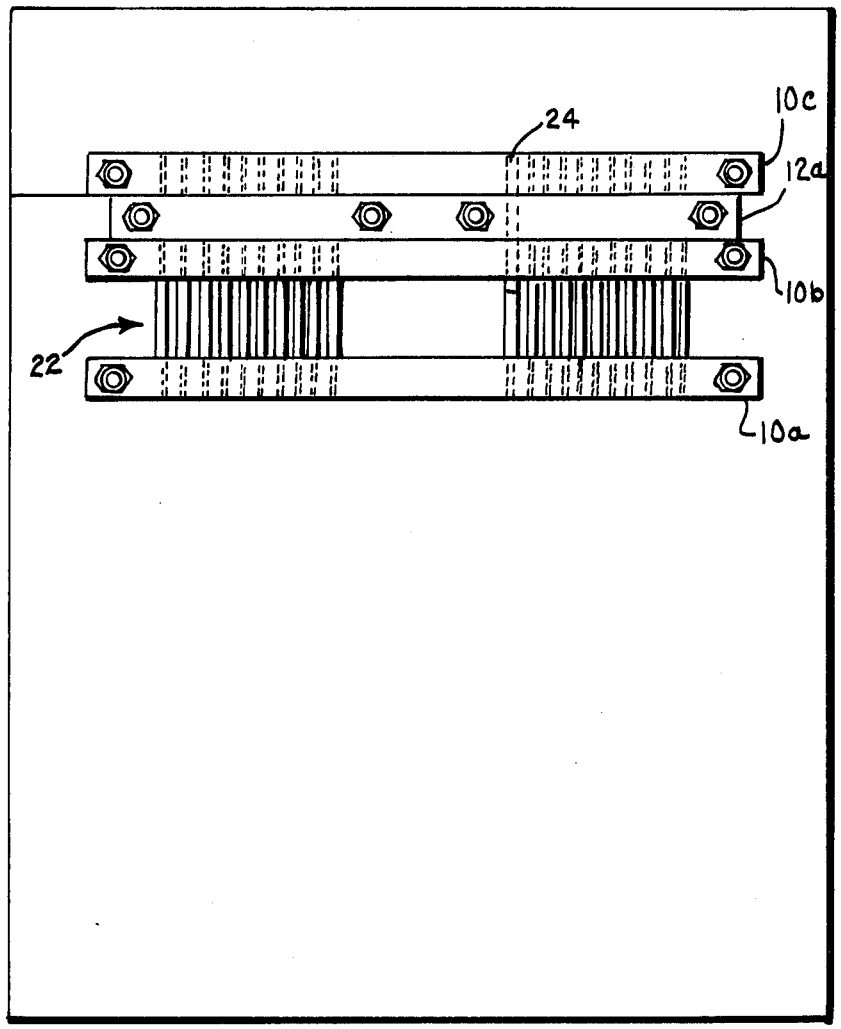
FIG. 2 is a top view of the keying apparatus illustrating the relative positions of the elements thereof.

FIG. 2 illustrates in greater detail the relative position of the pin guides 10 $a,b$ and $c$, and the pin locking apparatus 12$a$. In order to facilitate mating with the keygun, pin guide tubes 22 are mounted in recess holes in pin guides 10$a$ and 10$b$. The pin guide holes shown in pin guides 10$a$, $b$ and $c$ are precisely aligned to accept key pins, such as the single key pin 24 which is shown positioned in the pin guides 10$b$, $c$ for an illustrative example.

Figure 3:
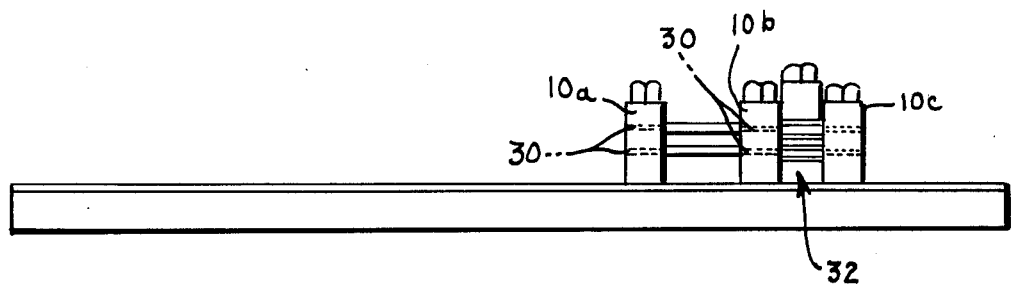
FIG. 3 is a side elevation of the keying apparatus.
Figure 4:
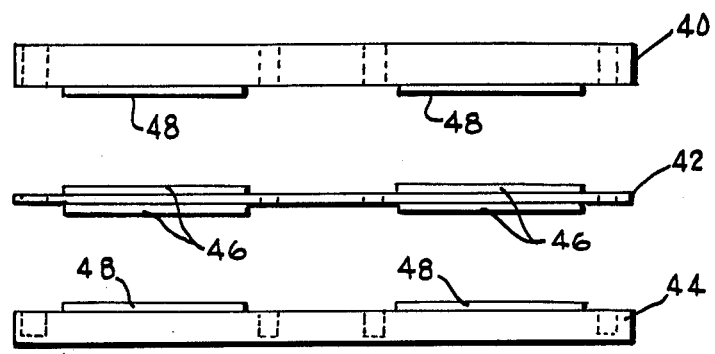
FIG. 4 is an exploded view of the pin locking apparatus which is utilized in the keying apparatus.

There is shown in FIG. 3 a side elevation view of the keying apparatus wherein the two rows of key pin holes in the pin guides 10$a$, $b$ and $c$ are shown in precise horizontal alignment. It may be further noted that pin guides 10$a$, $b$ have countersunk openings 30 to accept the pin guide tubes. The pin-locking apparatus 12$a$ which is shown positioned between the middle pin guide 10$b$ and the rear pin guide 10$c$, has friction pads 32 to hold the key pins in position. There is shown in FIG. 4 an exploded view of the pin locking apparatus wherein it is comprised of a top pin lock 40, a center pin lock 42, and a bottom pin lock 44. The center pin lock 42 has friction pads 46 mounted to the top and bottom surfaces therein as shown. The top and bottom pin locks 40, 44 have friction pads 48 respectively mounted to their inner surfaces as shown. The friction pads 46, 48 may be constructed of plastic leather or any other suitable material which will hold the key pins in a preset configuration or code.

The key apparatus illustrated in FIGS. 1 through 4 is constructed in the following manner in accordance with the given specifications:

1. Cut pin guides 10$a$, $b$, $c$ such that all are the same size with sides perpendicular.

2. Make template for keypin holes from the proper keygun, and transfer to pin guide 10$a$, centerpunch and drill with 5/64 drill. Care must be taken to assure hole centerlines are along the same lines.

3. Using pin guide 10$a$ as a template drill 5/64 holes in pinguide 10$b$, $c$. Counterbore backside of pin guide 10$a$ and front-side of pin guide 10$b$ 1/16 deep by ⅛ diameter. This is done to retain pin guide tubes. The front and middle pin guides 10$a$, $b$ in conjunction with the pin guide tubes form the main pin guide. Use of one piece of material for the main pin guide is not recommended since the material would be 2 1/16 inch thick and drilling with 5/64 drill would result in excessive drill creep.

4. Cut pin guide tubes 22 such that all are the same length. Deburr the inside of the tubes with a countersink to prevent pin binding.

5. Cut guide pins 24 such that all are the same length. Deburr ends with grinder.

6. Drill remaining holes in pin guide 10$a$. Drill only holes for long guide pin and plastic index pin in keygun. The short guide pin in the keygun does not require a hole since it is used for indexing on the front surface of pin guide 10$a$.

7. Construct the three-piece pin lock apparatus 12a. The pin lock 12a may be made of spring steel or carbon steel that can be heat-treated after drilling. This must be done to prevent bending of the pin lock. Polyurethane vinyl is recommended for the friction pads. Leather, vinyl rubber, or other suitable material will work also.

8. Assembly is accomplished by first inserting guide tubes in pin guide 10a and then fitting pin guide 10b. This three piece assembly is then bolted to the base plate 14. Lay the locking device behind pin guide 10b and bolt-down pin guide 10c such that there is a snug fit between the locking device and pin guides 10b, c. Note: Do not make the fit so tight that the locking plates cannot move.

9. Insert all the pins into the pin guide holes fitting them between the friction pads. The keying apparatus is now fully constructed and ready for operation use.

The keying apparatus is operated in the following manner:

a. Push all pins into the device until they are flush with the back of the rear pin guide;

b. Key and check keygun with the current extract and lock;

c. Slowly insert the keygun into the front of the keyer;

d. Leaving the keygun inserted, tighten bolts of the keying apparatus and remove keygun;

e. Take all keyguns to be keyed and push all pins to initial setting;

f. With the keygun unlocked insert them fully into the keying apparatus. This will push the pins to the correct setting;

g. Lock the keyguns and remove from the keying apparatus. The keyguns which have been keyed with the proper code are ready for operational use.

Although the invention has been described with reference to a particular embodiment, it will be understood to those skilled in the art that the invention is capable of a variety of alternative embodiments within the spirit and scope of the appended claims.

What is claimed is:

1. A code keying apparatus comprising in combination:

means for holding a plurality of key pins, said holding means maintaining said plurality of key pins in substantially parallel configuration to each said holding means allowing said plurality of key pins a degree of movement, said holding means comprising in combination, a plurality of pin guide units having a plurality of pin guide holes drilled therein, said plurality of pin guide holes being aligned throughout said plurality of pin guide units, said plurality of pin guide units being arranged in parallel with respect to each other, means for locking said plurality of key pins in a plurality of pin positions, said plurality of variable pin positions representing a predetermined code, said predetermined code being locked in place by said locking means, said locking means comprising in combination:

a plurality of pin locking bars having friction pads mounted thereto, said friction pads being utilized to contact and hold in place said plurality of key pins, said plurality of pin locking bars being fastened together and to said support base by a plurality of bolts and nuts, said plurality of pin locking bars being operatively fastened together so as to allow an increase or decrease of pressure upon said key pins, and a support base having said holding means and said locking means mounted thereto.

2. A code keying apparatus as described in claim 1 further including a plurality of pin guide tubes operatively positioned between the first and second pin guide units of said plurality of pin guide units.

* * * * *